UNITED STATES PATENT OFFICE.

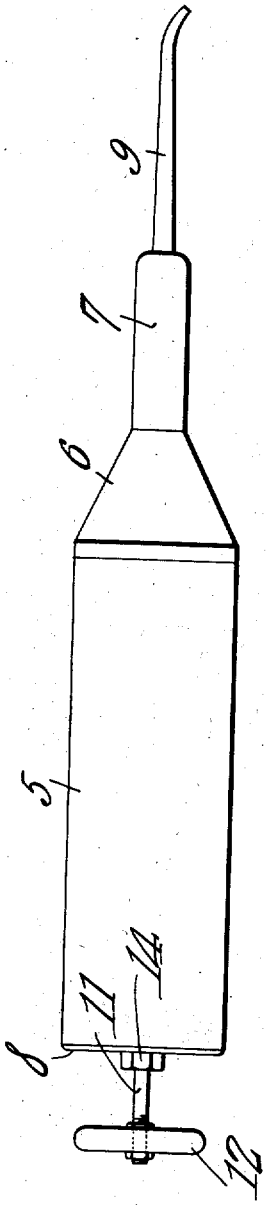
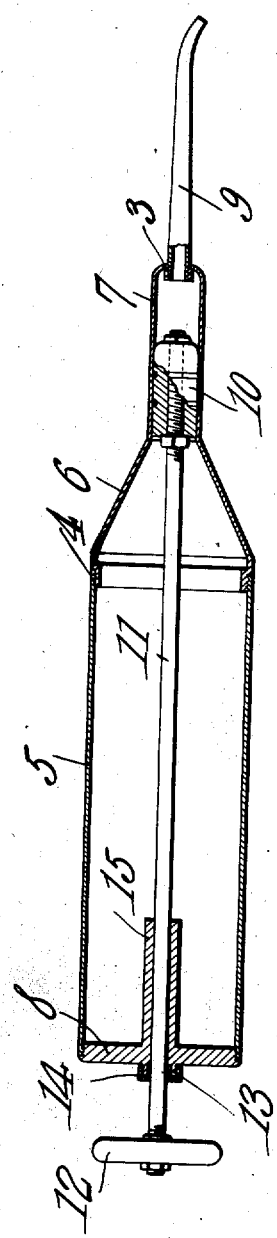

JAMES HENRY BUNKER, OF MILAN, KANSAS.

OILER.

987,283. Specification of Letters Patent. Patented Mar. 21, 1911.

Application filed July 22, 1909. Serial No. 508,991.

*To all whom it may concern:*

Be it known that I, JAMES H. BUNKER, a citizen of the United States, residing at Milan, in the county of Sumner and State of Kansas, have invented a new and useful Oiler, of which the following is a specification.

The oiler which is the subject of the present invention is designed more particularly for automobiles, and consists in the novel construction and arrangement of parts to be hereinafter described and claimed.

It is well known that it is a difficult task to oil some parts of an automobile, especially the differential and the transmission gearing thereof, not only on account of the inaccessible location but also by reason of the consistency of the lubricant usually employed, which is heavy and must be forced to reach the desired places.

It is the object of the present invention to facilitate the forced oiling of the different parts of the automobile and also to provide an oiler which is cleanly in operation and in which waste of the lubricant is eliminated.

Another object of the invention is to provide an oiler which can be easily filled, and which will hold a sufficiently large supply of lubricant to oil the machine several times without refilling.

In the accompanying drawing;—Figure 1 is an elevation of my improved oiler. Fig. 2 is a longitudinal sectional view thereof.

Referring to the drawing, 5 denotes the main body or reservoir of the oiler, which is preferably cylindrical in form, and has removably connected to one of its ends, by screw threads 4 or some other form of joint, a tapered portion or funnel 6, terminating at its smaller end in a cylinder 7, the diameter of which is less than the diameter of the main body 5. The opposite end of the main body is closed by a screw cap 8. The outer end of the cylinder 7 has a threaded opening 3 to receive a spout or nozzle 9, which is also removably connected to the cylinder, and which may have a terminal curve as shown.

In the cylinder 7 works a plunger 10 to which an operating stem 11 is connected, this stem extending through the main body 5, and through an opening in the cap 8, to the outside thereof, its outer end being fitted with a knob or handle 12. The cap has a stuffing box 13 through which the stem 11 extends, said stuffing box being closed by a gland nut 14. On the inner face of the cap and extending into the main body 5, is a tubular guide 15 of considerable length, through which the stem 11 also extends, and which serves to guide the same and cause the plunger 10 to enter the cylinder 7.

The operation of filling the oiler is as follows:—The plunger 10 is withdrawn from the cylinder 7 into the main body 5, possibly as far as the guide 15, and the funnel 6 is then unscrewed and removed from the main body, after which the latter is filled with oil to its capacity. The funnel 6 is then replaced and the oiler is ready for use. In use, the oiler is held with the cylinder 7 lowermost which causes a thin lubricant to flow into and through the funnel and thence into the cylinder until it fills the same, and it is forced out of the cylinder into and from the nozzle 9 by operating the plunger 10. In this operation the knob 12 is pressed upon to slide the stem 11 longitudinally through the guide 15, and the length of the latter and its axial disposition in true alinement with the cylinder 7 cause the plunger to move down the center of the body, through the funnel, and into the upper end of the cylinder behind the lubricant cupped therein; after which further pressure on the knob ejects the lubricant forcibly from the cylinder. After all of the charge therein has been ejected, the cylinder may be refilled without removing the oiler; and this is accomplished by drawing upward on the knob so that the plunger is drawn out of the cylinder for sufficient distance to allow the lubricant to flow into and again fill the latter. This operation is repeated until the main body 5 is emptied. When the oiler is not in use, the plunger will be pushed into the cylinder 7, in which position it acts as a closure, and prevents the lubricant from escaping. If necessary, as when the gearing is located in a close place or a rather thick oil is used as a lubricant, the nozzle can be removed and the lubricant discharged directly from the cylinder 7.

An oiler constructed as herein described is easily filled and operated, it is simple in structure, is clean in its operation, and there is no waste of the lubricant.

As above stated, the guide 15 is of considerable length, although I do not wish to be unnecessarily limited in this respect. It has three important functions; first it serves as a guide for the stem so that in the forward movement of the plunger the latter is directed straight into the cylinder, next it serves as a stop when the plunger is retracted and for this purpose its inner end should be farther remote from the inlet end of the cylinder than the length of the plunger itself, and finally it serves as a shield to prevent the escape of the lubricant through the stuffing box 13 in case the oiler should be stored by resting it on its larger end because in such position it is obvious that the lubricant would settle against the cap 8 around the guide 15.

What is claimed is:—

The herein described oiler, the same comprising a cylindrical body, a funnel detachably connected at its larger end to one end of the body, a cylinder connected at one end to and communicating with the smaller end of the funnel, and a nozzle detachably connected to the other end of the cylinder; combined with a cap removably closing the opposite end of the body, a long guide secured to the cap and extending into the body directly toward the axis of the cylinder, a stem slidably mounted through said guide and having a handle at its outer end, and a plunger on the inner end of the stem slidably and removably fitting within said cylinder and of less length than the distance between the inner end of the latter and the adjacent end of the guide.

In testimony that I claim the foregoing as my own, I have hereto affixed my signature in the presence of two witnesses.

JAMES HENRY BUNKER.

Witnesses:
  J. T. SAPPENFIELD,
  T. M. DERINGTON.